United States Patent [19]

Kilwin

[11] 4,373,923
[45] Feb. 15, 1983

[54] TORQUE LIMITING OVERLOAD COUPLING

[75] Inventor: Thomas C. Kilwin, Bridgeton, Mo.

[73] Assignee: UMC Industries Inc., St. Louis, Mo.

[21] Appl. No.: 103,844

[22] Filed: Dec. 14, 1979

[51] Int. Cl.³ .............................................. F16D 7/02
[52] U.S. Cl. .................................... 464/36; 192/56 R
[58] Field of Search .............. 64/29; 464/35, 36; 192/56 R

[56] References Cited

U.S. PATENT DOCUMENTS

| | | | |
|---|---|---|---|
| 1,883,164 | 10/1932 | Vassakos | 64/29 X |
| 2,493,232 | 1/1950 | Dodge | 64/29 X |
| 3,095,955 | 7/1963 | Orwin | 192/56 R |
| 3,270,844 | 9/1966 | Orwin | 192/56 R |
| 3,405,790 | 10/1968 | Orwin et al. | 192/56 R |
| 3,722,644 | 3/1973 | Steinhagen | 64/29 X |

*Primary Examiner*—Tony M. Argenbright
*Attorney, Agent, or Firm*—Paul M. Denk

[57] ABSTRACT

A torque limiting overload device, or clutch, and suitable for use between a shaft, flange, or the dial for automated machinery, or indexing machine, a drive or rotating member imparting turning or rotational force to a driven or rotatable member, the rotatable member incorporates a series of detent seats in which ball detents held by the driving member are normally seated and effect a simultaneous rotation between these two members; a suspension plate holds the detent balls with respect to the driving member with both the suspension plate and the seat of the rotatable member being in contact with each detent ball on the same axially disposed side and therein prevent damage to the balls as they are unseated upon the couplings countering a predetermined excessive torque. A bearing is urged by means of a spring against a bearing race that places pressure upon the ball detents to maintain their seating within the detent seats, with adjustments to the spring providing for a variation in the amount of pressure exerted upon the detent balls and therefore the degree of torque necessary to effect a decoupling of its torque limiting assembly.

20 Claims, 4 Drawing Figures

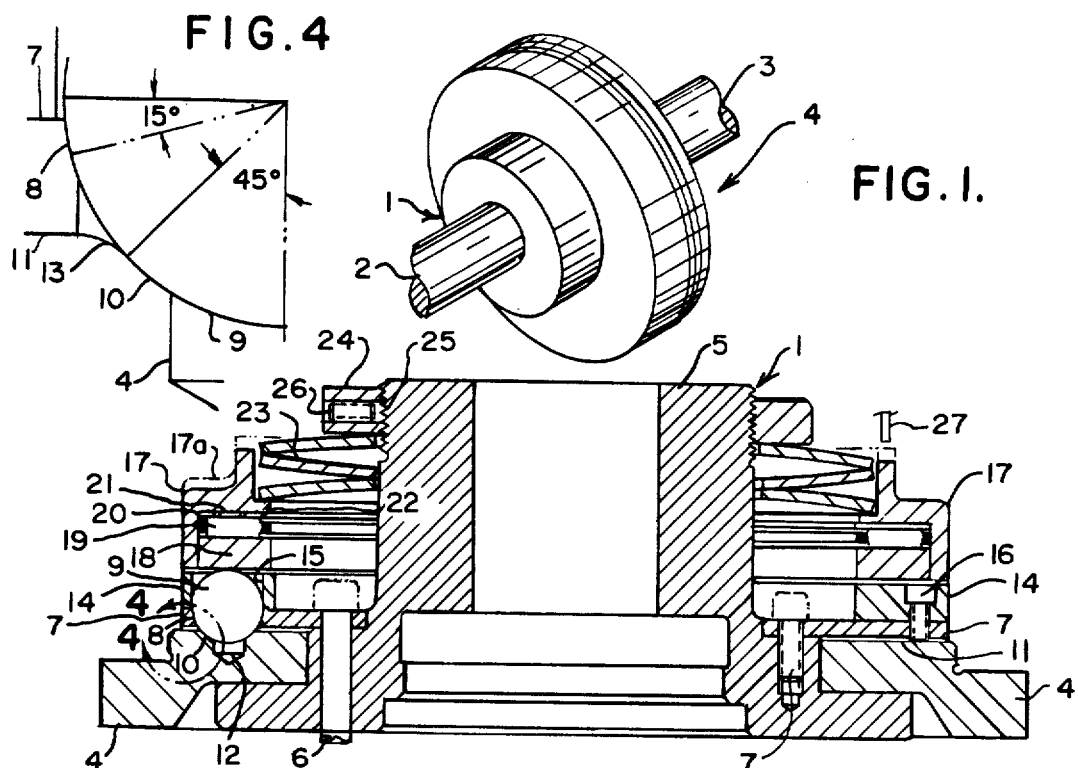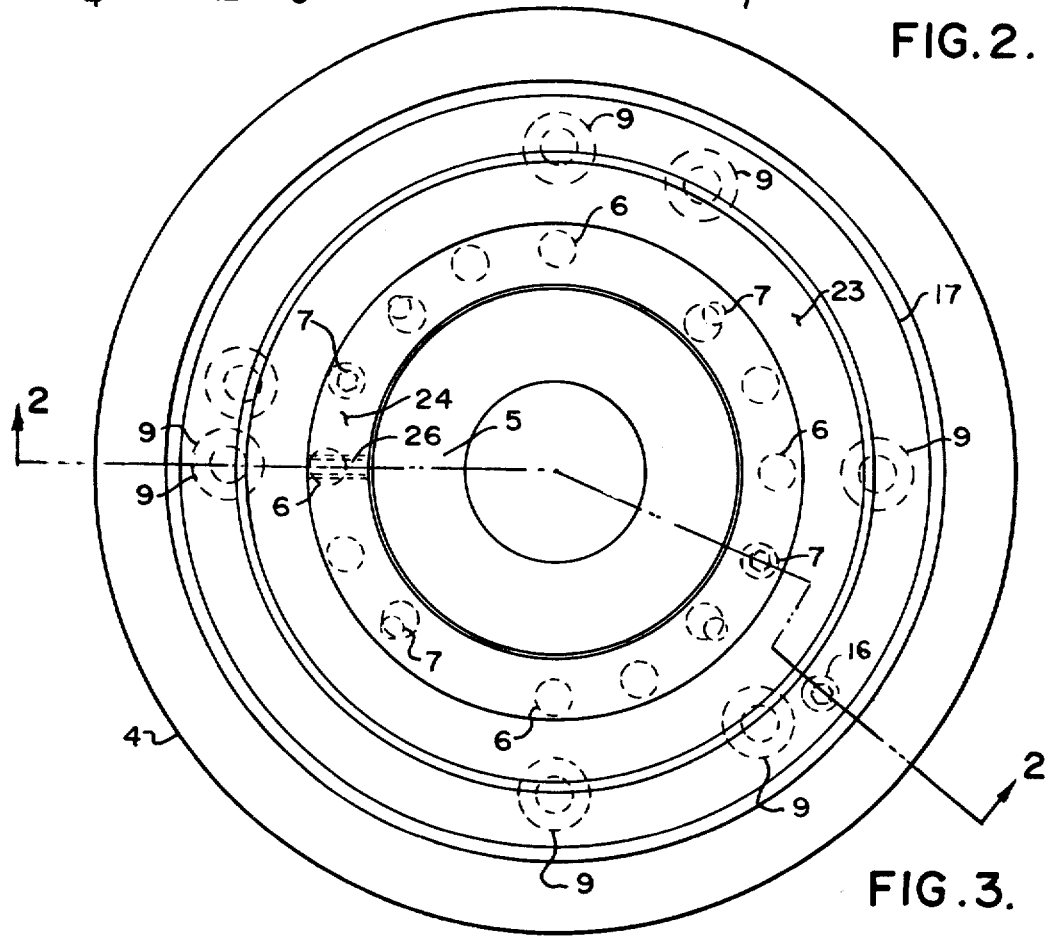

TORQUE LIMITING OVERLOAD COUPLING

CROSS REFERENCE TO RELATED APPLICATION

The subject matter of this application is an improvement upon the subject matter set forth and described in the application of Duane W. Woltjen, relating to Torque Limiting Overload Coupling, Ser. No. 841,364, filed on Oct. 12, 1977, now U.S. Pat. No. 4,174,621, and owned by a common assignee.

BACKGROUND OF THE INVENTION

This invention relates generally to a coupling means for use in maintaining driving force to machinery during routine operations, and more specifically pertaining to an improved torque limiting overload coupling device that effects drive disconnection and curtails machinery rotation with reduced incidence of damage to the operating components of said coupler, and the machinery at large.

There are a significant number of a variety and styles of associated shaft, flange, and dial type of coupling devices that are available in the prior art, and usually these devices are provided for interconnecting between the drive shaft of a motor, its speed reducer, or the like, and the main driven shaft for supporting components of the machinery apparatus being revolved. Many of these coupling devices are constructed in the category of flexible type couplings, and any of a variety of said connectors are designed for providing a transmission of the driving or rotational force or torque from a drive shaft to the intended driven shaft, but yet being capable of disconnection in the event that a binding force creates an excessive torque that prevents or significantly reduces turning of the component upon which work is being performed. In addition, safety means have on occasion been designed into these type of couplings, functioning in the manner as safety devices to prevent the exertion of excessive torque forces upon the driven means or shaft from damaging the drive means or shaft and its prime mover, or even from causing damage to the tool functionally performing some work upon a work component mounted upon the machinery, or from exerting excessive torque thereon in the first instance. Many of these safety devices have been designed in the category of machanically activated torque couplers, and as can be seen in the U.S. Pat. to Schultz, No. 2,771,171, a variety of magnetic pole pieces are arranged within a rotor means and normally effect a revolving of a driven member and its axial shaft for furnishing force transmission for rotation of a pair of axial shafts, but yet in the event that excessive force is applied to one of the shafts then the magnetic means is disengaged for curtailing the rotation of the driven shaft. The shown mechanically operated torque coupler of this U.S. patent, while it may be effective in its operations, is quite dissimilar from the mechanically actuated torque limiting means of the current invention.

An additional variety of magnetic coupling devices for preventing overload force from being exerted upon a driven shaft, and which finds significant usage in industry, are shown in the U.S. Pat. to Cowell, No. 3,221,389, and the U.S. Pat. to Gollos, No. 3,339,819. This latter patent is pertinent for disclosing a series of spherical projections that contact and intermesh with cups formed upon an opposite angular surface with these two separate components being held together through the agency of permanent magnets.

Further types of magnetic torque limiting devices, and specifically for use in low force operating mechanisms, such as phonograph record players or sound recorders, are shown in the two U.S. Pat. to Tiffany, No. 1,136,739, and Cornwall, No. 2,300,778.

The combination of magnetic couplers having spring biasing to determine the degree of force necessary for disengaging a coupling has also been available in the prior art, as shown in the U.S. Pat. to Allen, No. 3,053,365. And, other forms of connectors, which generally have utilized the permanent magnet approzch for effecting torque control are shown in the additional U.S. Pat. to Woolley, No. 3,277,669; the U.S. Pat. to Hornschuch, et al., No. 3,159,725; the U.S. Pat. to Spodig, No. 2,943,216; the U.S. Pat. to Beeston, Jr., No. 2,885,873; and finally, the U.S. Pat. to Hoad, No. 2,746,691, and which utilizes a frictional connection between magnets for determining the degree of torque necessary to effect discoupling of its torque limiting device.

Various ball detent couplings are available in the art, and some are shown in the U.S. Pat. Nos. 3,701,404; 3,680,673; 3,893,553; 3,981,382; 3,979,925; 3,942,238; 3,927,537; 3,930,382; and 3,866,728.

In addition, various machanical coupling devices, also utilizing the ball bearing type means for holding a driving part to a driven part are shown in the prior art, and such can be seen in the U.S. Pat. to Steinhagen, No. 3,774,738. It is significant to note, though, that in this prior art patent, to effect the decoupling of the device when an overload torque condition is encountered, that both the coupling balls must ride upwardly from their pockets formed within the driven member, and simultaneously, the same balls must move downwardly with respect to the pockets formed in their rotatable or driven means. Thus, there must be a plural axial movement of the coupling balls with respect to both the driven and rotatable parts of the shown coupling, and when such a condition prevails within this style of a coupling, usually back lash occurs, rotational looseness is encountered, and furthermore, since the coupling balls must ride free from their seating within diametrically spaced pockets, there is a tendency for said balls to become damaged after not too prolonged a period of time of usage. Similar type connections or machine element couplings are shown in the U.S. Pat. to Vassakos, No. 1,883,164, and the additional patent to Steinhagen, No. 3,722,644.

Other types of power transmitting mechanisms, having flexible couplings therein, are shown in the U.S. Pat. to Ely No. 1,541,489, in addition to those couplings also shown in the U.S. Pat. Nos. 4,006,608; 2,818,712; 3,050,965; 3,942,337; 1,566,553; 3,148,499; and the torque limiting brake shown in the U.S. Pat. No. 4,046,237.

The invention described in the Torque Limiting Overload Coupling application set forth in the cross reference to related application has been significantly improved through the innovations of this current invention in three major aspects; one being the ability of the structure of this invention to suspend the detent balls from the driving means and locate their seating within detent seats within the driven means through contact of these components solely within one axial half or hemisphere of the spherical detent balls, or all along one axial side thereof, to provide a connection between such components in a mechanism coupler that can provide precision control of the coupler during usage, effect a decoupling when that predetermined torque is encountered, and do so solely through the use of the suspended, as distinct from sandwiched, balls without need of any further tapering pins or the like, as described in said prior application, while thirdly, and to reduce the incidence of damage to such detent balls, by having the balls, upon their other surface, rest against a bearing mounted race that can likewise enter into some degree of revolving with the detent balls as and after they become unseated from within their driven member. These improvements have greatly enhanced the performance characteristics of this type of a coupling particularly when used in precision intermittent motion applications, so as to produce a minimum of backlash, add to the precision of work component positioning by means of any associated dial index, and to perform consistently in tripping when that excessively predetermined torque has finally been reached.

It is, therefore, the principal object of this invention to provide an overload torque coupling means wherein the ball detents are both positioned and held between the driving and driven means by surface contact as substantially only made upon one axial side of each said ball detent means.

Another object of this invention is to provide detent seats formed in a driven means and which are precisely contoured at their surface edges so as to authorize the ball detent to shift there out when a predetermined force is encountered, while reducing the incidence of abrasive damage to the ball or their seat surfaces when decoupling occurs.

Another object of this invention is to provide an improved style of overload torque decoupling means which functions with a minimum of rotational backlash, thereby eliminates all rotational looseness, as to improve the precisional operation of the driven member particularly when it may comprise or be connected with an indexing table, or the like, while at the same time achieving a more precise and consistent decoupling of the assembly when a trip torque is encountered.

Still another object of this invention is to furnish an overload torque coupler designed to enhance and lengthen the operational life of such a device by incorporating free moving bearings intermediate its ball detent and the pressure exerted by the resilient or spring means thereon in gauging the fixed torque setting for the assembly.

Yet another object of this invention is to provide an overload torque decoupling assembly incorporating a plurality of ball detents, wherein the detents are staggered so that once a discoupling occurs, the driving member will ride free with respect to the motion impeded driven member.

Still another object of this invention is to provide a means for accomplishing machinery deenergizing or shut-down momentarily after its decoupling means has attained disconnection.

Yet another object of this invention is to provide an overload coupling that may be conveniently inserted within the drive means to machinery, and having sufficient flexibility in its mounting so as to provide for its interconnection between a shaft-to-shaft, shaft-to-flange, flange-to-flange, or shaft or flange-to-dial type of assembly.

These and other objects will become more apparent to those skilled in the art upon reviewing the summary of this invention, and upon undertaking a study of the description of its preferred embodiment, in view of the drawings.

SUMMARY OF THE INVENTION

This invention relates to the construction of a dial torque overload clutch for furnishing total mechanically operative type overload decoupling or, as previously mentioned, for attaching a driving means and driven means for machinery together, and yet while achieving this function simultaneously minimizing the normally damaging effects that occur through usage of the various prior art couplings being utilized. And, due to the unique construction of this invention, the clutch has particular enhanced performance characteristics that are very desirable for use in conjunction with indexing mechanisms, wherein it performs with minimal backlash, curtails rotational looseness, adds to the precisional positioning of the dial index, and attains consistent torque tripping when a predetermined moment of force is encountered.

This invention incorporates the usual style of rotatable member that is revolved through the agency of a driving or rotating member, and utilizes the suspended ball detent principle for supporting each detent in proximity with its bearing seat formed within a very contiguous rotatable member. Thus, while prior art devices require an axial shifting of both the ball and at least one of the driving or driven members away from each other, and an unseating from both, with this invention, both these rotatable and rotating members are stationary, with the suspended ball only shifting against the urging of its resilient spring that normally bias the ball into its seating engagement only within the detent seat so formed along the proximate surface of the rotatable member. Thus, rotational backlash or looseness between the input or driving member and the output or driven member of such machinery is held to a minimum, a high degree of positional accuracy is maintained for the operating machinery, particularly where this decoupling device may be incorporated within precision index machines.

Most mechanical detent type decouplers or clutches have a large amount of rotational looseness due to positional inaccuracies of the detent seats with their mating detent bearings, and these seats are subject to damage as a result of repeated trippings of the mechanisms, all which have a tendency to contribute to the loss of that ever desired initial positional accuracy sought from and required of such mechanisms. As previously analyzed in the background of this invention, most prior art clutches require one of the detnet balls to be an axially movable rotational driving member. And, this axial movement requires a rotational looseness in order for the device to function, which therefore also detracts from the positional ability of the clutch and significantly contributes to its backlash. The current invention employs a unique arrangement for its detent wherein all of the detent seats, and the means for suspending the detent balls, are located all to one side, or in one axial hemisphere, of the balls, so that each ball as it is then unseated from its detent seat is merely urged upwardly from its suspension member, and does not require a double unseating, as significantly shown and required in the prior art, and even in the overload coupler as previously analyzed and identified in the cross reference to a related application of this assignee. The ball detent seats of this invention are incorporated in a plate rigidly fastened in both the rotational and axial planes of the driving member, and thus eliminate the rotational looseness as previously analyzed. This arrangement also makes it possible to produce ball seats in the driving member, and more specifically within its ball suspension plate, in alignment with the driven member detent seats, formed upon its surface, as a matched pair to eliminate tolerance and variations which is normally only found in the prior art type of decouplers previously analyzed. In this invention, as in most of the prior art described, the detent ball is a rolling type element so that a trip torque setting is very consistent relative to the frictional type of detent clutches, as explained, which also avoids damage to the ball seats, such as does occur and causes positional problems with clutches that incorporate the frictional detent type of decoupling when an excessive torque is encountered.

In summary, this invention includes the driving member, which incorporates a flange or other means of connection with a shaft, another flange, or the like for furnishing rotational power from a motor, or other driving instrument, with this member having the suspension or detent plate fixedly connected thereto, with the detent seats being formed preferably at unequal arc angles around its circumference, with their balls being conveniently seated therein. The balls are positioned by means of a ball retainer, and which retainer allows the balls to enter into some limited axial elevation as when decoupling occurs for this instrument. An annular bearing race biases against the detent balls on a side opposite from their ball seats, and a thrust bearing rests against the race and thereby allows it to enter into some limited turning as when the balls are encountering a force that causes their unseating. This has the effect of significantly reducing damage to the balls during their unseating operation, and essentially eliminates the abrasiveness that is associated with the friction generated upon the surface of the balls as they unseat in the prior art type of decouplers. A bearing retainer conveniently positions the bearing in place, and spring means biases against the retainer for urging that degree of force upon the balls to maintain their seating relationship and to withstand torque forces up to that which beyond decoupling occurs. An adjustable retainer threadedly engages upon the driving member and can be readjusted, one way or the other axially, so as to provide for a variation in the torque induced operation setting for the decoupling device.

The driven member, or the rotatable member, of this coupling device, conveniently seats intermediate the flange of the driving member, and the suspension plate holding the ball detents, with said member having a race formed along a circumference around said member, and corresponding detent seats formed therein in alignment with the detent balls' positioning through the agency of the suspension plate. To further reduce damage to the ball detents, and also to those surfaces upon which they may roll, the concave spherical or conical seats as formed in the rotatable member are designed having some curvature, as along a radius, as they blend from their formed seats into the aforesaid race surface. Thus, when a decoupling force is encounted, the balls roll along this radius, or curvature, during unseating, rather than become bound along a sharpened edges as is so frequently designed into prior art type of decouplers.

BRIEF DESCRIPTION OF THE DRAWING

In the drawing, FIG. 1 provides an isometric view of the improved torque limiting overload coupling device of this invention;

FIG. 2 provides a sectional view through the coupling of this invention taken along the line 2—2 of FIG. 3;

FIG. 3 provides a top plan view of the invention; and

FIG. 4 furnishes a schematic drawing of the contact angular relationship of the detent balls resting upon their suspension plate and rotatable member seat of the invention, taken along line 4—4 of FIG. 2.

DESCRIPTION OF THE PREFERRED EMBODIMENT

In referring to the drawings, and in particular FIG. 1, there is shown an overall configuration for this clutch assembly, or this improved torque limiting overload coupling A, and which generally incorporates an input or driving means 1, receiving its power from a drive shaft 2, or the like, and which cooperates with the means to be driven, which in this particular instance, comprises the output shaft 3 as shown. Obviously, as previously explained, rotational force may be transmitted through the coupler of this invention not only by way of a shaft-to-shaft arrangement, as shown, but also may transmit power through flanges, dials, or and combination of the foregoing.

As can also be seen in FIG. 3, the invention is of annular configuration, and in referring also to FIG. 2, the drive component 1 incorporates the series of mechanisms that provide for controlled transfer of force from the drive shaft 2 (See FIG. 1) to a driven member, which in this particular instance, comprises the rotatable flange or member 4. Essentially, the driving member 1 includes a hub-like portion 5, to which the drive shaft 2 may connect, or be integrally formed thereof, or which also may be secured to said hub through the agency of the fastening means 6 that may rigidly secure the same to said hub at its opposite surface. The fastening means 6, in addition to the fasteners 7, tightly secure upon a shoulder of the hub 5 a detent suspension plate 7 and included within this plate 7 are a series of contoured seats 8, and for use for normally seating the detent balls or bearings 9 as shown. As can be understood, the detents 9 obviously revolve with the turning of the rotating part of hub 5 and its detent suspension plate 7.

As can also be seen from FIG. 3, in this particular embodiment, there are approximately seven positions for locating of the detent balls 9, and while that particular number of balls may be desirable for this particular embodiment, other numbers of detents may be located within the seats 8 provided around the circumference of this assembly, and function just as properly for the purposes of this invention. On the other hand, it is to be noted that in the location of the balls they are significantly staggered, and while the assembly will work reasonably effective if the detents are arranged at equidistant arcs around the plate circumference, to stagger the same facilitates the operation of the device after it has decoupled, thereby requiring that the coupler make at least one complete turn before each of the balls simultaneously come into alignment with their respective seats 10 upon the rotatable or driven number 4.

Actually, in the preferred design for this invention, and in a larger embodiment for this overload coupling, it can be adjusted to be decoupled upon encountering a force at a minimum of 10,000 inch-pounds, or be adjusted to withstand torque forces up to 30,000 inch-pounds, and approximately nine detent balls are spacedly arranged within the assembly. In that model which can withstand minimum and maximum inch-pounds of force between 3,000 and 10,000, respectively, approximately seven detent balls, as shown in the drawings, are provided. And, in a smaller embodiment for this overload coupling, where the inch-pounds of torque that may be encountered before decoupling occurs at a minimum of 500 inch-pounds, or up to 2,000 inch-pounds, approximately five detent balls are arranged within the clutch device.

The driven member 4 in this particular instance is formed in the arrangement of annular flange, so that it may be connected with the member to be rotated, as for example the under side of an indexing dial or other precision operating machinery (not shown). Detent seats 10 are provided spacedly around the surface 11 of the member 4, and each of these seats are located at positions that come into alignment with the seats 8 as previously explained as provided through the suspension plate 7. And, clearance appertures 12 are also provided counterbored below the seats 10, primarily for the purpose of proving clearance, a good fit between the ball and its seat by eliminating seat bottom intact, and also to insure proper contact of the 45° contact point. As can be seen in FIG. 4, the detent seats 10 formed upon the surface 11 of the rotatable member 4 are generally contoured at the same radius as that of the ball detent 9, usually at a concave spherical conic, in order to assure a snug seating of the balls therein and to provide consistency in the known quantity of torque necessary to urge the balls upwardly to undertake an unseating therefrom. In addition, and in order to prevent any damage to the surface of the balls 9 as they undertake or become unseated, each of the detent seats 10 has a formed convex radius, as at 13, blending into the flat top surface 11 of the rotatable member 4, so that no sharp edges are encountered by the ball during a decoupling function. Generally, the location of the detent seats 10 are arranged approximately around 45° off of the vertical axis of the detent ball 9 as shown in FIG. 4. And, what is further significant, and as is also shown in this figure, is the fact that the corresponding seats 8, formed upon the detent suspension plate 7, are also disposed at less than 90° from the aforesaid vertical axis of the ball 9, which, as can be understood, means that the full support for the balls 9, in their positioning through the suspension plate 7, and their resting upon the detent seats 10, all occurs upon one axial side of the ball, meaning that while excessive torque is encountered, the ball merely need be lifted from its two supports, namely, the suspension plate 7, and the driven means 4, to attain the desired decoupling. There is no requirement that the balls must also unseat from bearing seats located diametrically or on the opposite side of the detent seats 10, as in the prior art, which usually does have a tendency to cause too much frictional or abrasive damage to the balls' surface after repeated decoupling occurences.

Also rigidly connecting upon the upper surface of the detent suspension plate 7 is the ball retainer 14, having a series of apertures 15 provided therethrough, with said retainer being originally held to the suspension plate 7 by means of a series of fasteners, one as shown at 16. Thus, this retainer, and its apertures 15, provide a passageway that is clearly aligned with each seat 8 of the suspension plate, so that as a ball is lifted upwardly during decoupling, it is guided for slight passage upwardly within the retainer at least sufficiently to provide for its clearance from the detent seats 10. When this occurs, the detent balls 9 will then be free to ride around the surface 11 of the member 4, and which surface in that instance functions in the nature of a race upon which the balls ride. As previously explained, since the balls are staggered in their positioning, as shown in FIG. 3, it takes one complete revolution, as shown in FIG. 3, before all of the detent balls come back into simultaneous alignment with their respective seats 10. Thus there is not repeated impacting forces encountered by each ball as it rides over each adjacent ball seat 10, such as would occur if all of the balls were located at equal arc angles apart from each other. It is desirable to have at least three of the balls unaligned from the seats at all times during a decoupled situation, except for when that total alignment occurs once during each turn of the driving means.

Arranged axially upwardly from the ball retainer 14 are the means that provide for adjustment in the amount of pressure applied to each ball 9, so as to provide for a presetting in the amount of torque that will be required to effect an unseating of the balls when an excessive decoupling force has been encountered mainly due to some impediment imposed upon the rotating member 4. This force adjusting means includes a thrust bearing retainer 17, which is arranged for slight shifting, as can be seen at its hidden line outline 17a. This retainer embraces a first thrust bearing race 18, which biases against the base detents on one side, and also rests against a bearing, such as the roller thrust bearing 19, which in turn also contacts against another bearing race 20. The race 20 butts against a shoulder 21 formed integrally of the thrust bearing retainer 17. Said retainer incorporates an inwardly disposed lip 22, and resting upon this lip is a resilient means 23, in this particular instance, being a series of disc springs, as shown, and which are held in place through the agency of a retaining nut 24. This retaining nut is adjustable in its fitting upon the hub 5, being threadedly connected therewith, as at 25, so that it may be raised or lowered with respect to the springs and thereby increase or decrease the quantity of force being exerted through the retainer 17 and eventually upon the detent balls 9. Also the number of disc springs used may vary to attain the range of pressure required for the coupling's proper operation for a given situation. A set screw 26 can be tightened to secure the retaining nut 24 in place, once it has been turned to its desired position, and set to provide that amount of biasing pressure necessary to hold the ball detents 9 within the rotatable member seats 10, so that a predetermined amount of tripping force will be necessary to effect an unseating of the balls 10, and a continued rotation of the driving means 5, while the member 4 may have become fixed, or decreased in its angular momentum.

Obviously, it is not desirable to have the driving means or rotating member 5 to continue a turning at high speed with respect to the motion impeded rotatable member 4, since as previously explained, when the member 5 makes one complete revolution, its detent balls 9 will each become simultaneously aligned with their seats 10. Thus, at that instance, there may be a tendency for the balls to only momentarily encounter the edges 13 of their seats 10, which could have a deleterious effect upon each balls's surface. Hence, and to alleviate that problem, as the bearing retainer 17 is urged upwardly, or axially away from the rotatable member 4 and the axially fixed suspension plate 7 and the ball retainer 14, the upper edge of the bearing retainer 17 may encounter a limit switch, as at 27, to provide for instantaneous shut-down of the motor or other prime mover providing rotation to the driving means 5. But, since such rotation does not occur instantaneously, there is usually sufficient relative rotation between the member 5, and the rotatable member 4, so that usually one complete revolution will have occurred between these driving and driven members, so that all of the ball seats 10 will again become in alignment with the detent balls 9 of the clutch, so as to provide for an automatic resetting of the same into their detented positions.

Variations in the design of this torque limiting coupling may occur to those skilled in the art upon reviewing the subject matter of this disclosure. Such variations or modifications, if within the spirit of this invention, are intended to be encompassed within the scope of any patent claims issuing hereon. The description as set forth is primarily made for illustrative purposes only.

Having thus described the invention, what is claimed and desired to be secured by Letters Patent is:

1. A torque limiting coupling assembly for use in retaining driving and driven means together during normal usage of machinery but effecting disconnection of said means when a maximum predetermined torque is exceeded, a rotating member for said assembly included in said driving means, a rotatable member included within said driven means of the assembly, the improvement which comprises, detent means, cooperating detent seats provided upon the rotatable member and for use in seating the said detent means, said detent means when seated within the said detent seats effecting a simultaneous turning of said driven means by the driving means during routine operation of the machinery and with the exertion of excessive torque causing an unseating of the detent means from within their seats and an incident reduction in the rotation of said driven means, a detent means suspension plate connecting within said rotating member of the driving means and providing for supporting said detent means for normal seating within the rotatable member seats, both the detent means support by the suspension plate and the detent seats of the rotatable member normally being in contact with the detent means only on that side of the detent means in contact with the said rotatable member.

2. The invention of claim 1 and wherein said detent means comprises ball detents, and that hemisphere of the ball detents in seating engagement with the rotatable member seats also being contiguously supported by the suspension plate.

3. The invention of claim 2 and including a ball retainer connecting with said suspension plate, said retainer having a series of passages therein, each passage provided for accommodating a said ball detent, and said ball detent capable of some movement within said passage during their unseating from the seats of the rotatable member.

4. The invention of claim 3 and including resilient means provided upon the said rotating member and normally biasing and holding said ball detents within their respective seats upon the rotatable member.

5. The invention of claim 4 and wherein said resilient means being adjustable in its setting to provide for a variation in the amount of torque necessary to effect unseating of the ball detents from the rotatable member.

6. The invention of claim 5 and wherein said resilient means comprises a spring.

7. The invention of claim 6 and wherein said spring comprises a disc spring.

8. The invention of claim 6 and wherein an adjustment nut threadedly engages upon the rotating member and being urged against the spring, the readjustment of said nut providing for variation in the amount of torque required to unseat the ball detents from their seating upon the rotatable member.

9. The invention of claim 4 and including a bearing means arranged intermediate the ball detents and the resilient means to allow some relative movement within the rotating member as the said ball detents are unseating from the rotatable member.

10. The invention of claim 9 and including a bearing race provided intermediate said bearing means and the ball detents and normally transferring the biasing force from the resilient means to the said bell detents.

11. The invention of claim 10 and including a bearing retainer holding said bearing means and race in position, and said retainer being axially shiftable as the detent balls unseat from the rotatable member.

12. The invention of claim 11 and including a switch means responsive to the movement of the bearing retainer and capable of initiating a deenergizing of the driving means upon an unseating of the detent balls from the rotatable member.

13. The invention of claim 12 and wherein said resilient means biases against the bearing retainer to normally retain the ball detents within their rotatable member seats.

14. The invention of claim 11 and including another bearing race disposed between the bearing means and the bearing retainer.

15. The invention of claim 2 and wherein said rotatable member is annular in design, and said rotatable part having a surface forming a partial race upon which the ball detents ride during their unseating after the assembly encounters excessive torque, said detent seats being arranged along the alignment of said race.

16. The invention of claim 15 and including there being a transition radius formed between each detent seat and the said disposed race to cushion the initial movement of the detent balls during their unseating as the assembly encounters a decoupling torque.

17. The invention of claim 2 and including each of the said driving and driven means include one of a machinery shaft, flange, and dial.

18. A torque limiting overload coupling for use in conjunction with machinery and capable of interconnecting between a combination of shafts, flanges, and dials, said coupling useful for retaining a driving and driven means together during normal usage of the machinery but effecting disconnection of said means when a maximum predetermined torque is exceeded, at least a portion of one of said driving and driven means capable of some axial displacement when entering disconnection, detent means arranged between said driving and driven means, detent support means connecting upon said driving means for suspending said detent means, detent seats provided upon said driven means and with the detent means normally seated therein for effecting simultaneous rotation of the driven means by the driving means during routine machinery usage, and said detent seats of the driven means and the support of the driving means contacting each detent means only upon that same axially disposed side normally in contact with and seated by the said detent seats.

19. The invention of claim 18 and wherein said driven means is annular in design, the said driven means having a surface forming a partial race upon which the detent means ride during their unseating after the assembly encounters excessive torque, and said detent seats being arranged along the alignment of said race.

20. The invention of claim 19 and including there being a transition radius formed between the detent seats and the said disposed surface race to cushion the initial movement of the detent means during their unseating as the assembly encounters a decoupling torque.

* * * * *